United States Patent [19]

Nelson et al.

[11] 3,844,184
[45] Oct. 29, 1974

[54] LOAD EQUALIZED TRANSMISSION
[75] Inventors: John Edward Nelson, Montreal; Norman Astor Stock, Beaconfield, Quebec, both of Canada
[73] Assignee: Dominion Engineering Works, Limited, Lachine, Quebec, Canada
[22] Filed: May 21, 1973
[21] Appl. No.: 362,084

[52] U.S. Cl............................. 74/665 GA, 74/665 P
[51] Int. Cl............................................. F16h 37/06
[58] Field of Search............. 74/661, 665 G, 665 GD, 74/665 GA, 665 B, 665 P; 192/.02, .098, 48.4; 310/78

[56] References Cited
UNITED STATES PATENTS
3,299,685   1/1967   Kocks et al.................. 74/665 GA X
3,369,636   2/1968   Nelson............................. 192/.02
3,398,596   8/1968   Jahnke......................... 74/665 P X
3,543,064   11/1970  Holper......................... 74/665 P X
3,734,257   5/1973   Eastcott et al................. 192/.098 X
3,757,912   9/1973   Ball, Jr. et al..................... 102/.02

Primary Examiner—Samuel Scott
Assistant Examiner—Lance W. Chandler

[57]  ABSTRACT

A large grinding mill for reducing friable ores is driven by a single electric motor coupled in driving relation with a pair of pinions by means of low speed high torque pneumatic clutches.

7 Claims, 2 Drawing Figures

PATENTED OCT 29 1974  3,844,184

LOAD EQUALIZED TRANSMISSION

This invention is directed to an improved transmission for coupling a single electric motor in speed reducing relation with a large load, such as a grinding mill.

BACKGROUND OF THE INVENTION

In the ore grinding art, the increase of mill size, to permit greater output and enhanced milling efficiency has led to difficulties in overcoming the high inertia of such mills, and achieving satisfactory starting.

The adoption of a synchronous induction motor as a relatively low cost prime mover for driving the mill necessitates running the drive motor up to synchronous speed before engaging the transmission with the mill. The use of a clutch at the input to the reduction gearbox leads to many difficulties, in view of the high speed differential encountered, and the high inertia to be overcome, particularly where a 900 RPM electric motor may be involved, necessitating the use of an intermediate gearbox having a large speed reduction ratio. The provision of a pair of clutches at the split output from a reduction gear having twin output shafts facilitates starting, while at the same time dividing in two the thermal dissipation load which occurs on start-up.

SUMMARY OF THE INVENTION

Thus there is provided a method of starting a high inertia low speed rotary load, driven by a high speed low torque prime mover by way of reduction gearing, including a first speed reduction gearbox having a twin output connectible in driving relation with a pair of pinions in meshing relation with a large gear attached to the load, including the steps of starting and accelerating the prime mover and the reduction gearbox to a desired speed, and coupling the twin output from the gearbox to the load, to bring the load up to speed, whereby the kinetic energy of the prime mover, prior to connection thereof in driving relation with the load, includes the kinetic energy of the speed reduction gearbox.

The present invention may thus be practiced by the provision of a gear drive for driving a large slow speed machine such as a mill by means of a relatively high speed electric motor through a large diameter ring gear in driving relation with the mill, comprising: a gearbox having a single input shaft and a reduction gear therein with two output shafts extending therefrom; a pinion for each output shaft coupled in driving relation with the ring gear, and clutch means interposed between each pinion and the respective output shaft, to facilitate starting of the drive and to promote load sharing between the pinions.

The selection of overload-limited pneumatic which can accept a limited pre-determined percentage such as 150 percent of normal load before slipping, and can maintain such a torque output substantially constant during the start-up period permits utilization of a prime mover fixedly coupled to the reduction gearbox, with the variable coupling provided as clutches associated with the multiple output shafts.

BRIEF DESCRIPTION OF THE DRAWING

Certain embodiments of the present invention are described, reference being made to the accompanying drawings, wherein.

DESCRIPTION OF THE PREFERRED EMBODIMENT

Figure 1:
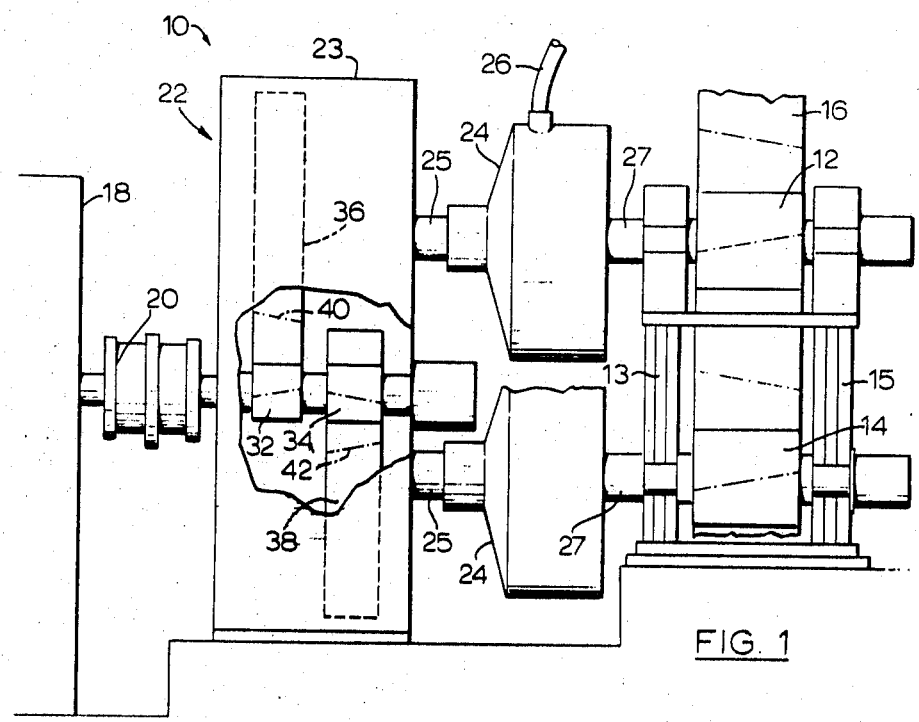
FIG. 1 is a front elevational view, in part section, of a portion of a gear drive according to the invention.
Figure 2:
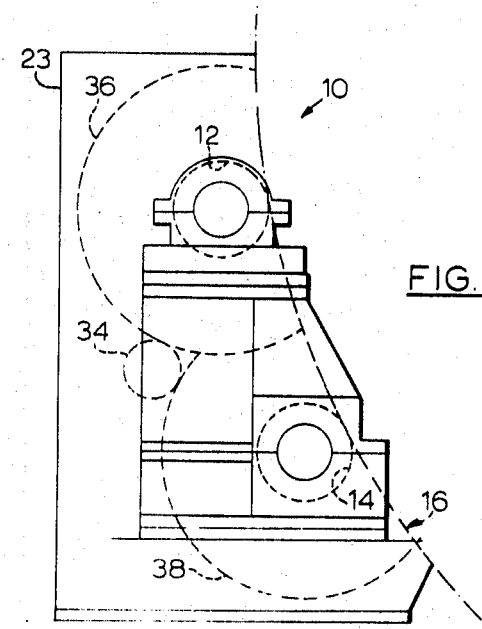
FIG. 2 is a side view of the arrangement.

Referring first to FIG. 1, this view is edge-wise on to the ring gear being driven, while FIG. 2 is taken normal thereto.

The gear drive 10 comprises an upper pinion 12 and lower pinion 14 mounted between end supports 13, 15 in driving relation with a large gear wheel 16 (illustrated in part) attached in driving relation to a grinding drum (not shown).

A large electric motor 18 has the output therefrom connected by way of a single coupling 20 to a reduction gearbox 22. The twin output shafts 25 of the gearbox 22 are respectively connected to twin clutches 24, the visible upper one being illustrated as pneumatically actuated by air supply line 26. The clutch output shafts 27 are connected respectively to the upper pinion 12 and lower pinion 14.

In order to permit the use of a single helical gear 16, as indicated by the inclined chain dotted line across the face thereof rather than using a herring bone or double helical gear, the axial thrusts generated by the respective reduction gears 36, 38 within the box walls 23 are balanced by oppositely handing the pinions 32, 34 of the gearbox 22, the upper and lower gears 36, 38 within the box being correspondingly handed to match the respective pinions, as may be seen from the representative chain dotted tooth pitch lines shown in FIG. 1. A limited capability for end float in the respective pinions provides mutual adjustment in tooth loading to accommodate to minor manufacturing inequalities in the teeth of the main gear.

In operation, the synchronous motor 18 is started and run up to speed, the clutches 24 being disengaged. When synchronous speed is reached the clutches are actuated, their operation being limited to a fixed percentage of full-load torque. Owing to the load splitting afforded by the two clutches, and the relatively low speed differential, satisfactory torque transference between the gearbox and the respective pinions may be effected, preferably using air actuated clutches. Hydraulic clutches of suitable type may be substituted. Substitution of a clutch in place of the coupling at the gearbox input presents certain unobvious advantages in balancing momentum and inertia in the system on start-up.

A further advantage afforded by the present invention, in providing the clutch connection to the load at the output of the gearbox is that the inertia of the gearbox, which is quite considerable, instead of being added to that of the load, adds to the momentum of the motor. Thus, by accelerating the driving motor and the reduction gearbox to synchronous speed the kinetic energy thus generated is available to assist in overcoming the inertia of the standing load, comprising the mill and its immediate reduction gear wheel and pinions.

What I claim as new and desire to secure by Letters Patent of the United States is:

1. A method of starting a high inertia system having a low speed rotary load driven by a high speed low torque prime mover through speed reduction gearing, including a first speed reduction gearbox having a twin output concurrently connectible by respective slip clutches in torque transmitting relation with a pair of pinions mounted in driving relation with a large gear attached to the load, including the steps of starting and accelerating the prime mover and the reduction gearbox to a desired speed, coupling the twin output clutches concurrently between the gearbox and the load, limiting the coupling torque to a predetermined function of full load torque, and bringing the load to the desired speed, whereby the kinetic energy of the moving portion of the system prior to the coupling step includes the energy of rotation of the first speed reduction gearbox.

2. The method according to claim 1 wherein said prime mover is a synchronous electric motor.

3. The method according to claim 2 wherein said coupling torque exceeds normal full-load torque.

4. A gear drive for driving a large slow speed machine by means of a large diameter ring gear connected in driving relation therewith, comprising: a gearbox having a single input shaft and a reduction gear therein with two output shafts extending therefrom; a pinion associated with each output shaft, coupled in driving relation with the ring gear, and slip clutch means interposed between each pinion and the respective output shaft, to facilitate start up of the drive and promote concurrent load sharing between the two pinions.

5. The gear drive as claimed in claim 4 wherein said gearbox is provided with thrust-balancing compensation between said output shafts, to minimize anchoring provision of the gearbox.

6. The gear drive as claimed in claim 4 wherein said clutch means includes a pneumatic clutch.

7. The gear drive as claimed in claim 5 wherein said clutch means includes a pneumatic clutch.

* * * * *